(No Model.)
C. BULMER.
TONGS.
No. 541,590.  Patented June 25, 1895.
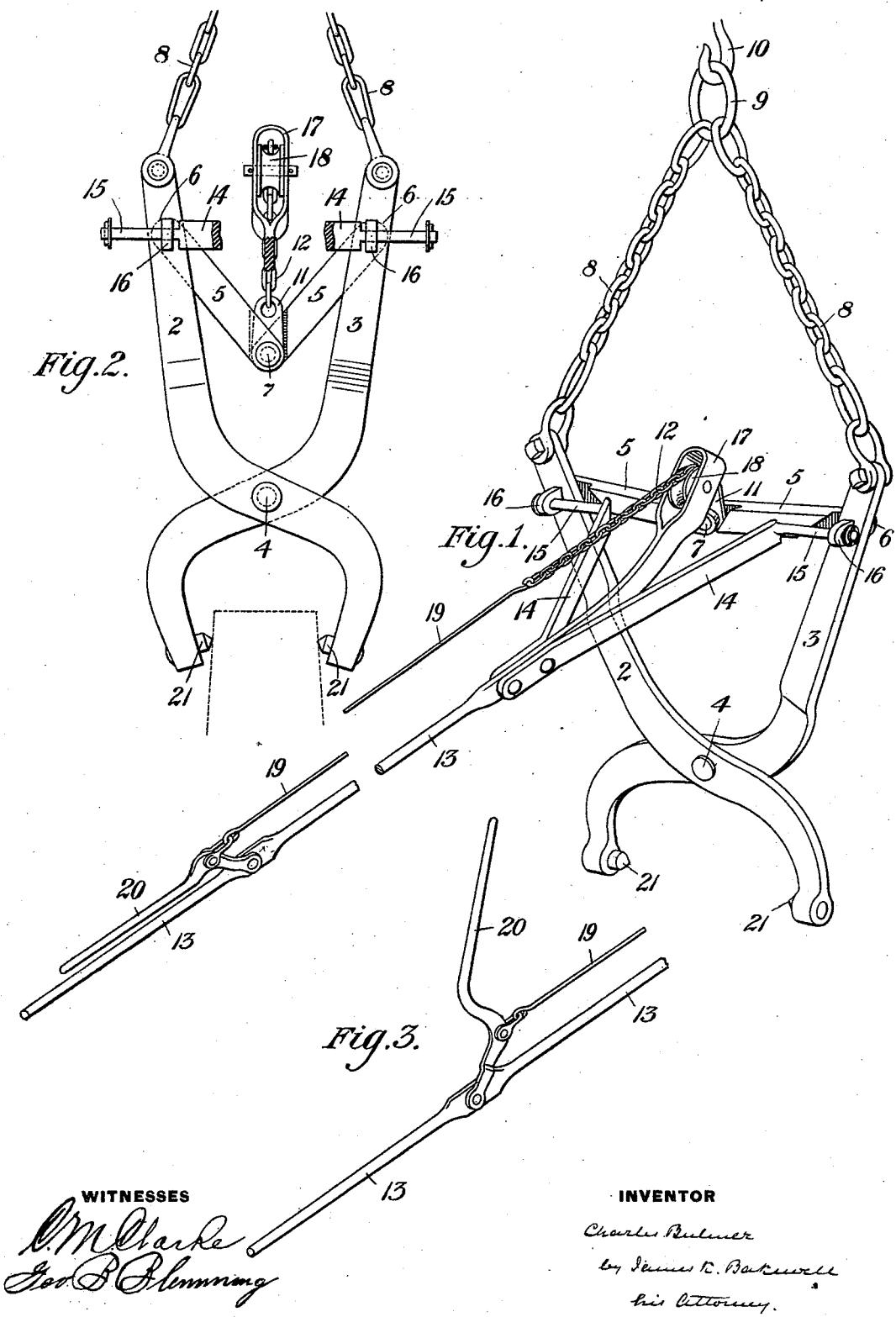
WITNESSES
INVENTOR

UNITED STATES PATENT OFFICE.

CHARLES BULMER, OF HOMESTEAD, PENNSYLVANIA.

TONGS.

SPECIFICATION forming part of Letters Patent No. 541,590, dated June 25, 1895.

Application filed April 23, 1895. Serial No. 546,888. (No model.)

*To all whom it may concern:*

Be it known that I, CHARLES BULMER, of Homestead, in the county of Allegheny and State of Pennsylvania, have invented a new and useful Improvement in Tongs, of which the following is a full, clear, and exact description, reference being had to the accompanying drawings, forming part of this specification, in which—

Figure 1 is a perspective view of my improved tongs in their open position. Fig. 2 is an elevation of the same in the position of grasping the ingot, and Fig. 3 is a detached view of the handle or operating-lever in the position it assumes when the tongs are closed.

My invention relates to tongs for handling ingots and other metal bodies, and it has for its object the improvement of their construction whereby they may be easily opened and closed, and the ingot or other article may be readily handled by a single operator.

In the drawings 2 and 3 represent the crossed arms forming the tongs, which arms or levers are pivoted on the pin 4 and are connected at the ends of the levers by the toggle bars 5 which are pivoted to the levers by the eye-bolts 6, and to each other, at a point midway between the levers, by a pin 7. Extending from the ends of the levers 2 and 3 are the chains 8, which are shackled to the ends of the levers and are united at their other ends by the ring 9 through which the hook 10 of the crane chain is passed. Pivoted on the pin 7 is a link 11 to which a chain 12 is secured.

For the purpose of operating the tongs and directing their movement, there is a rod or handle 13 which is provided with a yoke 14 at the outer end of which are the pintles 15 which extend at right angles to the handle 13 through the eyes 16 of the bolts 6 which are loosely journaled in the levers 2 and 3 near the ends thereof. At the end of the rod or handle 13, directly over the toggle bars 5, is an eye 17 in which is pivoted the sheave 18 over which the chain 12 passes to the end of the rod 19, which rod extends along the handle 13 to a lever 20 which is pivoted to the handle 13 near the end thereof. The tongs are provided at their jaws with suitable gripping teeth 21.

The operation is as follows: When it is desired to handle an ingot, the tongs, which are swinging from the crane, are brought over the ingot by means of the handle 13 in the hands of the operator, and the lever 20 is brought down on the handle which draws the chain 12 up through the sheave 18 and extends the toggle bars 5, and thereby the arms 2 and 3 are spread apart, the eyes 16 sliding over the pintles 15, and the jaws of the tongs are ready to grasp the ingot. The jaws are then placed in position by the handle 13 and they are closed on the ingot by a reverse movement of the lever 20.

The advantages of my invention will be apparent to those skilled in the art. The tongs are simple and they are readily operated by a single workman.

Although I have described my improved tongs as adapted to handling ingots, I do not desire to limit them to this use, nor do I desire to limit myself to the exact features of construction shown and described.

Having thus described my invention, what I claim, and desire to secure by Letters Patent, is—

1. Tongs having lever arms and gripping jaws in combination with toggle bars connected with the lever arms, a chain for suspending the tongs, a handle extending horizontally or at substantially right angles from the tongs, and a device for operating the toggle bars, substantially as and for the purpose specified.

2. Tongs having lever arms and gripping jaws in combination with toggle bars connected with the levers, a handle having pintles passing loosely through eyes on the levers, and a device for operating the toggle bars, substantially as and for the purpose specified.

3. Tongs having toggle-bars connected with the levers, a handle connected with the tongs, a sheave, a chain connected with the toggle-bars and passing along the handle, and a lever connected with the chain, substantially as and for the purpose specified.

In testimony whereof I have hereunto set my hand.

CHARLES BULMER.

Witnesses:
JAMES K. BAKEWELL,
W. T. TREDWAY.